(12) United States Patent
Jones, Jr. et al.

(10) Patent No.: US 12,184,599 B1
(45) Date of Patent: Dec. 31, 2024

(54) SYSTEMS AND METHODS FOR IMPROVING COMMUNICATION EFFECTIVENESS

(71) Applicant: UNITED SERVICES AUTOMOBILE ASSOCIATION (USAA), San Antonio, TX (US)

(72) Inventors: David M. Jones, Jr., San Antonio, TX (US); Robert Lee Black, San Antonio, TX (US); Timothy Blair Chalmers, San Antonio, TX (US); Gideon Bowie Luck, Wylie, TX (US); Sumita T. Jonak, San Antonio, TX (US); Ana Rosa Maldonado, San Antonio, TX (US); Oscar Roberto Tijerina, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 17/659,891

(22) Filed: Apr. 20, 2022

Related U.S. Application Data

(60) Provisional application No. 63/177,614, filed on Apr. 21, 2021.

(51) Int. Cl.
*H04L 51/216* (2022.01)
*H04L 51/10* (2022.01)
*H04L 51/214* (2022.01)

(52) U.S. Cl.
CPC ............ *H04L 51/216* (2022.05); *H04L 51/10* (2013.01); *H04L 51/214* (2022.05)

(58) Field of Classification Search
CPC ...... H04L 51/216; H04L 51/214; H04L 51/10
USPC ......................................................... 709/206
See application file for complete search history.

(56) References Cited

U.S. PATENT DOCUMENTS

| | | | |
|---|---|---|---|
| 8,495,071 B1 * | 7/2013 | Nakajima | G06Q 10/107 707/753 |
| 9,202,203 B2 * | 12/2015 | Tsai | H04L 51/42 |
| 9,282,073 B1 * | 3/2016 | Avital | H04L 51/226 |
| 2008/0065736 A1 * | 3/2008 | Gross | G06Q 10/107 709/207 |

(Continued)

*Primary Examiner* — Nicholas R Taylor
*Assistant Examiner* — Chong G Kim
(74) *Attorney, Agent, or Firm* — Fletcher Yoder, P.C.

(57) ABSTRACT

Embodiments of the present disclosure include systems and methods for managing group information such as electronic mail (i.e., email) communications, text message communications (e.g., including instant messaging), calendar entries, contact information, and so forth, to improve communication effectiveness between members of a group (e.g., a group of an organization, such as a company, school, and so forth). For example, the embodiments described herein include prioritizing certain subsets of group information management data associated with a particular member of the group, to provide certain subsets of group information management data associated with the particular member of the group during a time period that is determined based at least in part on prior activity (e.g., prior usage habits) of the particular member, and to recommend suggested time periods to interact with the particular member of the group to other members of the group based at least in part on the prior activity.

13 Claims, 4 Drawing Sheets

(56) References Cited

U.S. PATENT DOCUMENTS

| | | | | |
|---|---|---|---|---|
| 2009/0094340 | A1* | 4/2009 | Gillai | G06F 15/16 |
| | | | | 709/206 |
| 2014/0229555 | A1* | 8/2014 | DeLuca | H04L 51/212 |
| | | | | 709/206 |
| 2015/0301696 | A1* | 10/2015 | D' Jesus Bencci | H04L 51/046 |
| | | | | 715/752 |
| 2019/0180248 | A1* | 6/2019 | Byun | G06Q 10/1095 |
| 2021/0216946 | A1* | 7/2021 | Schoenmackers | |
| | | | | G06Q 10/06314 |
| 2021/0344635 | A1* | 11/2021 | Vukich | H04L 51/42 |
| 2023/0206089 | A1* | 6/2023 | Kim | H04L 67/564 |
| | | | | 706/46 |

\* cited by examiner

SYSTEMS AND METHODS FOR IMPROVING COMMUNICATION EFFECTIVENESS

CROSS-REFERENCE TO RELATED APPLICATION

This application claims priority to and the benefit of U.S. Provisional Application No. 63/177,614 entitled "Systems and Methods for Improving Communication Effectiveness," filed Apr. 21, 2021, which is hereby incorporated by reference in its entirety for all purposes.

TECHNICAL FIELD

The present disclosure relates generally to systems and methods for managing group information such as electronic mail (i.e., email) communications, text message communications (e.g., including instant messaging), calendar entries, contact information, and so forth, for the purpose of improving communication effectiveness between members of a group (e.g., a group of an organization, such as a company, school, and so forth).

BACKGROUND

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

With an ever-increasing reliance on email usage, the amount of email messages received by individuals on a daily basis can become quite daunting. In particular, it is becoming increasingly difficult for individuals to identify which email messages are the most relevant to their particular interests, other than the email messages being marked as more or less urgent, a process which may also be manipulated so as to not be very helpful. As such, it is becoming increasingly important to categorize and classify email messages in a way that enables communications to be easily found and accessed.

BRIEF DESCRIPTION

Certain embodiments of the present disclosure include a group information management system that includes one or more group information management database servers configured to store group information management data associated with a plurality of members of a group. The group information management system also includes one or more group information management servers configured to provide group information management data associated with a first member of the group to a first application being executed on a first computing device associated with the first member of the group. A subset of the group information management data associated with the first member of the group is prioritized by the one or more group information management servers based at least in part on one or more interactions with the subset of the group information management data associated with the first member of the group via other applications being executed on other computing devices associated with other members of the plurality of members of the group.

Certain embodiments of the present disclosure also include a group information management system that includes one or more group information management database servers configured to store group information management data associated with a plurality of members of a group. The group information management system also includes one or more group information management servers configured to provide group information management data associated with a first member of the group to a first application being executed on a first computing device associated with the first member of the group. A subset of the group information management data associated with the first member of the group is provided to the first member of the group during a time period that is determined by the one or more group information management servers based at least in part on prior activity of the first member of the group via the application.

Certain embodiments of the present disclosure also include a method that includes storing, in one or more group information management database servers, group information management data associated with a plurality of members of a group. The method also includes receiving, via one or more group information management servers, data relating to one or more interactions with a subset of the group information management data from the plurality of members of the group. The method further includes providing, via the one or more group information management servers, the subset of the group information management data to a specific member of the providing, via the one or more group information management servers, the subset of the group information management data. The subset of the group information management data is prioritized by the one or more group information management servers based at least in part on the one or more interactions.

Certain embodiments of the present disclosure also include a method that includes storing, in one or more group information management database servers, group information management data associated with a plurality of members of a group. The method also includes receiving, via one or more group information management servers, data relating to one or more interactions with a subset of the group information management data from the plurality of members of the group. The method further includes providing, via the one or more group information management servers, the subset of the group information management data to a specific member of the plurality of members of the group during a time period that is determined by the one or more group information management servers based at least in part on prior activity of the specific member of the plurality of members of the group.

It is appreciated that implementations in accordance with the present disclosure can include any combination of the aspects and features described herein. That is, implementations in accordance with the present disclosure are not limited to the combinations of aspects and features specifically described herein, but also include any other appropriate combinations of the aspects and features provided.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
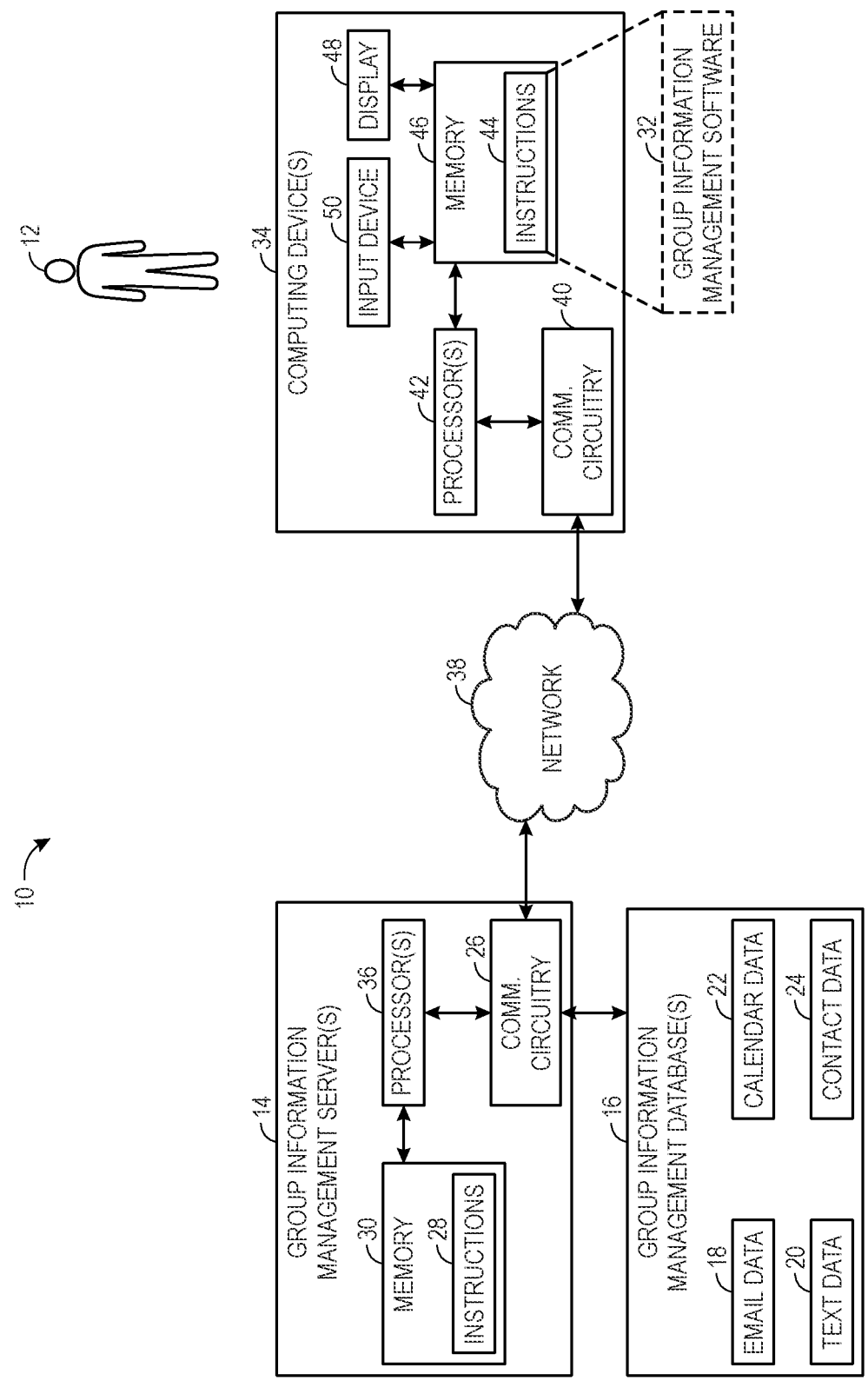
FIG. 1 is a schematic diagram of a group information management system configured to manage group information for members of a group, in accordance with embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

In the following description, for the purposes of explanation, numerous specific details are set forth in order to provide a thorough understanding of embodiments of the present disclosure. It will be apparent, however, to one skilled in the art that embodiments of the present disclosure may be practiced without some of these specific details.

The embodiments described herein include systems and methods for managing group information such as electronic mail (i.e., email) communications, text message communications (e.g., including instant messaging), calendar entries, contact information, and so forth, for the purpose of improving communication effectiveness between members of a group (e.g., a group of an organization, such as a company, school, and so forth). For example, the embodiments described herein are configured to prioritize certain subsets of group information management data associated with a particular member of the group, to provide certain subsets of group information management data associated with the particular member of the group during a time period that is determined based at least in part on prior activity (e.g., prior usage habits) of the particular member, and to recommend suggested time periods to interact with the particular member of the group to other members of the group based at least in part on the prior activity.

In particular, the embodiments described herein include group information management database servers configured to store group information management data associated with the members of the group (e.g., data relating to email messages, text messages, calendar entries, and contact information associated with the members of the group), and group information management servers configured to provide the group information management data to a group information management application being executed on computing devices associated with members of the group. For context, it will be appreciated that the group information management database servers and group information management servers described herein may be substantially similar to the Microsoft Exchange system, and the group information management application described herein may be substantially similar to Microsoft Outlook. However, the embodiments described herein provide specific advantages over such systems, which improve communication effectiveness between the members of the group.

For example, in certain embodiments, the group information management servers described herein may be configured to prioritize certain subsets of group information management data associated with a particular member of the group (e.g., email messages the particular member sent, received as an addressee, or was copied on; text messages the particular member was on a message string for; calendar entries the particular member was either a required or optional attendee for; contact information for contacts that the particular user has saved in their profile; and so forth) in an application being executed on a computing device associated with the particular member of the group based at least in part on interactions with the subsets of group information management data associated with the particular member of the group via other applications being executed on other computing devices associated with other members of the group. For example, over and beyond any explicit prioritization on particular email messages, text messages, calendar entries, contacts, and so forth, placed on these group information management data (e.g., by members of the group), the group information management servers described herein are configured to analyze interactions with the group information management data.

For example, within larger organizations and distributed teams, email and text message accumulation may become an increasing problem. In certain embodiments, certain email messages and text messages may be given higher priority based on machine learning with respect to email and/or text messaging characteristics. In particular, certain characteristics of email and text messages may indicate relative importance to a particular member of a group, or a particular group of an organization. The embodiments described herein may be used to emphasize higher priority email and text messages while de-emphasizing lower priority email and text messages and, perhaps, marking these email and text messages for possible archiving. As but one non-limiting example, if a particular team (e.g., group) within a company (e.g., organization) has 90% of its members leaving a particular email message unread for a threshold period of time, this may be interpreted that the email message is not particularly relevant to the particular team. Conversely, the email message may be read by many members of another team, but responded to by the other team, suggesting that the email message may be very relevant to the other team.

Many various factors may be used by the group information management servers to determine which group information management data should be prioritized. For example, as discussed above, in certain embodiments, unread/read status of a particular item of group information management data may be used to determine the prioritization. In addition, in certain embodiments, content and/or keywords within the particular item of group information management data may be used to determine the prioritization. For example, if a particular member of a group is responsible for a particular project, keywords in items of group information management data relating to this particular project may be used to identify the items of group information management data as relatively important to the particular member. In addition, in certain embodiments, email and text messages may be prioritized based on who sending the message and/or who all are receiving the message. For example, if an email or text message is received by a member of a group from a supervising member of the group, the email or text message may be prioritized. Similarly, if a supervising member of the group is even copied on a particular email or text message, the message may be prioritized. Conversely, if a particular email or text message is sent from a member that is in a sub-group that is entirely unrelated to a sub-group to which the receiving member is a part, the message may be prioritized lower. In addition, in certain embodiments, the explicit prioritization (e.g., as set by the sending member) may be used in conjunction with the analysis described herein to help the group information management servers determine appropriate prioritization of the particular email or text message.

In addition, in certain embodiments, the group information management servers described herein may be configured to provide certain subsets of group information management data associated with a particular member of the group (e.g., email messages the particular member sent, received as an addressee, or was copied on; text messages the particular member was on a message string for; calendar entries the particular member was either a required or optional attendee for; contact information for contacts that the particular user has saved in their profile; and so forth) in an application being executed on a computing device associated with the particular member of the group during a time period that is determined by the group information management servers based at least in part on prior activity (e.g., prior usage habits) of the particular member via the application. For example, in certain embodiments, the group information management servers described herein may analyze prior activity of the particular member with respect to the application to determine time periods when the particular member is most likely to act of certain types of group information management data. In addition, in certain embodiments, the group information management servers described herein may be configured to provide recommendations relating to suggested time periods to interact with the particular member of the group to other applications being executed on other computing devices associated with other members of the group based at least in part on prior activity of the particular member of the group.

For example, oftentimes, employees have difficulty finding time to work when there are significant number of meetings to attend. The group information management servers described herein may be configured to identify work block outs based upon gaps in calendar entries, identified workloads, and so forth. In addition, the group information management servers described herein may be configured to determine optimal communication time detection and delivery based on prior activity of the particular member. With busy schedules and multiple forms of communication, there are many instances where communication inundation may occur within an organization. The group information management servers described herein may identify and recommend particular types of communication and times of communication between members (e.g., which other members may elect certain communications to be delivered to the particular member). For example, calendar entries may provide an indication of when effective communication may be provided to the particular member. In addition, the group information management servers described herein may be configured to determine when the particular member has previously responded to the same types of group information management data. For example, success/failure rates of different types of group information management data for the particular member may indicate particular recommended communication types.

FIG. 1 is a schematic diagram of a group information management system 10 configured to manage group information such as electronic mail (i.e., email) communications, text message communications (e.g., including instant messaging), calendar entries, contact information, and so forth, for members 12 of a group (e.g., of an organization, such as a company, school, and so forth), as described in greater detail herein. For example, one or more group information management servers 14 are configured to store and access group information data stored in one or more group information databases 16. Such group information data may include, but is not limited to, email data 18, text message data 20, calendar data 22, and contact data 24, among other types of group information data.

As illustrated in FIG. 1, in certain embodiments, the group information management servers 14 may each include processing circuitry such as one or more processors 26 configured to execute instructions 28 stored in memory media 30 of the group information management servers 14, wherein the instructions 28, when executed by the one or more processors 26, enable the group information management servers 14 to perform the functions described in greater detail herein. In particular, the one or more processors 26 may be configured to execute instructions 28 to cause the group information management servers 14 to store and/or access the group information data stored in the one or more group information databases 16, and to transmit and/or receive group information data from group information management software 32 being executed on one or more computing devices 34, as described in greater detail herein. In general, the group information management servers 14 function to facilitate access to the group information data stored in the one or more group information databases 16 to the group information management software 32 being executed on one or more computing devices 34.

In certain embodiments, the one or more processors 26 of the group information management servers 14 may be any suitable type of computer processors or microprocessors capable of executing computer-executable code. In certain embodiments, the memory media 30 of the group information management servers 14 may be any suitable articles of manufacture that can serve as media to store processor-executable code, data, or the like. These articles of manufacture may represent computer-readable media (e.g., any suitable form of memory or storage) that may store processor-executable code (e.g., the instructions 28) executed by the one or more processors 26 to perform the presently disclosed techniques. In certain embodiments, the memory media 30 of the group information management servers 14 may represent tangible, non-transitory computer-readable media (e.g., any suitable form of memory or storage) that may store the processor-executable code used by the one or more processors 26 to perform various techniques described herein. It should be noted that non-transitory merely indicates that the media is tangible and not a signal. It should be noted that the components described above with regard to the group information management servers 14 are exemplary components, and the group information management servers 14 may include additional or fewer components in certain embodiments.

The group information management servers 14 may also include communication circuitry 26 configured to facilitate communication between the group information management servers 14 and the computing devices 34, as described in greater detail herein. For example, as described in greater detail herein, in certain embodiments, the group information management servers 14 may communicate group information data (e.g., email data 18, text message data 20, calendar data 22, and contact data 24, among other types of group information data) between the one or more computing devices 34 and the one or more group information databases 16 via a communication network 38, as described in greater detail herein. In certain embodiments, the communication circuitry 26 may facilitate communications using Wi-Fi, near field communication, Bluetooth, Zigbee, radio frequency identification (RFID) tags and/or readers, an embedded wireless module, and/or another suitable wired or wireless communication network 38.

In addition, the computing devices 34 may also include communication circuitry 40 configured to facilitate communication of group information data (e.g., email data 18, text message data 20, calendar data 22, and contact data 24, among other types of group information data) between the group information management servers 14 and the computing devices 34 via the communication network 38. In certain embodiments, the communication circuitry 26 may facilitate communications using Wi-Fi, near field communication, Bluetooth, Zigbee, radio frequency identification (RFID) tags and/or readers, an embedded wireless module, and/or another suitable wired or wireless communication network 38.

As illustrated in FIG. 1, in certain embodiments, the computing devices 34 may also include other processing circuitry such as one or more processors 42 configured to execute instructions 44 stored in memory media 46 of the respective computing device 34, wherein the instructions 44, when executed by the one or more processors 42, enable the respective computing device 34 to access group information data (e.g., email data 18, text message data 20, calendar data 22, and contact data 24, among other types of group information data) stored in the one or more group information databases 16, as described in greater detail herein. In particular, in certain embodiments, the computing devices 34 may execute group information management software 32, which may run as an application displayed on a display 48 (e.g., a light emitting diode (LED) display, an organic LED (OLED) display, and so forth) of the respective computing device 34, and the respective member 12 may interact with one or more input devices 50 of the respective computing device 34 to interact with the group information management software 32 for the purpose of accessing, updating, and so forth, the group information data (e.g., email data 18, text message data 20, calendar data 22, and contact data 24, among other types of group information data) stored in the one or more group information databases 16, as described in greater detail herein.

In certain embodiments, the one or more processors 42 of the computing devices 34 may be any suitable type of computer processors or microprocessors capable of executing computer-executable code. In certain embodiments, the memory media 46 of the computing devices 34 may be any suitable articles of manufacture that can serve as media to store processor-executable code, data, or the like. These articles of manufacture may represent computer-readable media (e.g., any suitable form of memory or storage) that may store processor-executable code (e.g., the instructions 44) executed by the one or more processors 42 to perform the presently disclosed techniques. In certain embodiments, the memory media 46 of the computing devices 34 may represent tangible, non-transitory computer-readable media (e.g., any suitable form of memory or storage) that may store the processor-executable code used by the one or more processors 42 to perform various techniques described herein. It should be noted that non-transitory merely indicates that the media is tangible and not a signal. It should be noted that the components described above with regard to the computing devices 34 are exemplary components, and the computing devices 34 may include additional or fewer components in certain embodiments.

Figure 2:
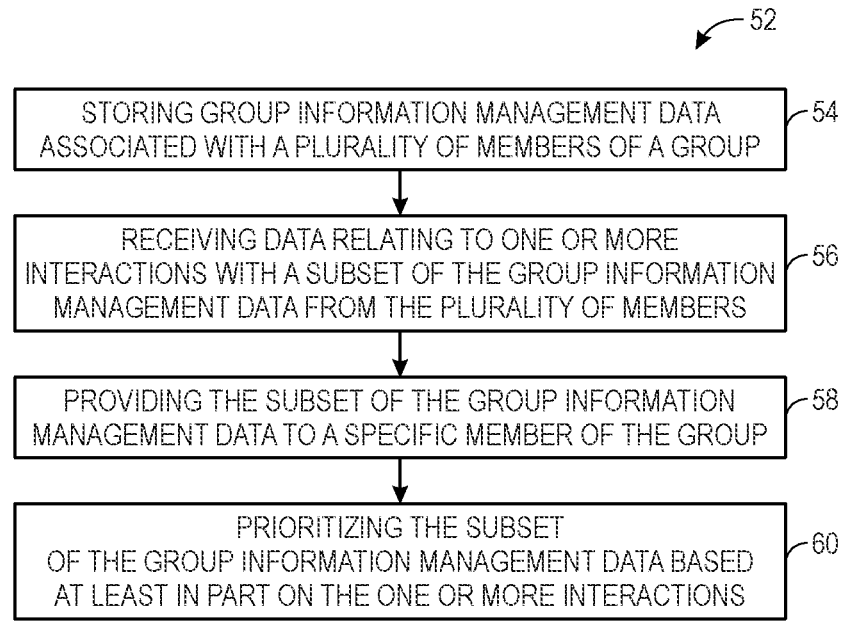
FIG. 2 is a flow diagram of a method of operating the group information management system of FIG. 1, in accordance with embodiments described herein.

FIG. 2 is a flow diagram of a method 52 of operating the group information management system 10 of FIG. 1 that may be performed by a processor 36 of the group information management server 14. Although the method 52 has been described as being performed by the processor 36, it should be noted that any suitable processing device may perform the method 52, such as the processor 42 of the computing device 34.

As illustrated, in certain embodiments, the method 52 may include storing (e.g., in the group information database (s) 16 of FIG. 1) group information management data (e.g., email data 18, text message data 20, calendar data 22, and contact data 24, among other types of group information management data) associated with a plurality of members 12 of a group (block 54). As described herein, the group information management data may generally include data relating to email messages, text messages, calendar entries, and contact information associated with the members 12 of the group.

In some embodiments, the processor 36 may store the text message data 20 and/or email data 18 subsequent to a text message or email being sent using group information management software 32, such as an email application, a text-based communication application, a calendar management application, and the like. In general, text message data 20 and/or email data 18 may include a portion of the text message and/or email or the entirety of the text message or email. For example, in response to an email being sent using an email application (e.g., executed on the computing device 34), the processor 36 may receive the email and analyze the content of the email to generate email data 18. The email data 18 and/or extracted email data may include a body of a message between a sender and recipient(s), previously received text messages or emails, and/or keywords described in the email that may indicate a level of priority of an action to be taken associated with a project (e.g., "status", "approved", "urgent", "delay"). Additionally, email data 18 and/or extracted email data may include a list of recipients on emails as well as whether the recipients were carbon copied (cc'd), blind carbon copied (bcc'd), or directly addressed (e.g., the recipient directly following the "to:" portion). As such, the processor 36 may store the extracted email data 18 in the group information management database 16 to determine a relative prioritization of the email.

It should be noted that while the discussion above relates to email data 18, block 54 of the method 52 may also apply to text message data 20, calendar data 22, and/or contact data 24. For example, the processor 36 may extract text message data 20 from a text message transmitted by an application being executed on the computing device 34. The text message data 20 and/or extract text message data may include recipient(s) information, sender information, and keywords, as described above with respect to the email data 18. As such, the processor 36 may store the extracted text message data 20 in the group information database 16 to determine a relative prioritization of the text message.

As another non-limiting example, in certain embodiments, the processor 36 may extract calendar data 22 from a calendar entry generated using an application being executed on the computing device 34. The calendar data 22 and/or extracted calendar data may include a time period (e.g., a date or a time duration) corresponding to an event (e.g., a meeting, a deadline, an appointment), data indicating individuals participating in the meeting, a project corresponding to the meeting, and keywords, as described above with respect to the email data 18. As such, the processor 36 may store the extracted calendar data 22 in the group information database 16 to determine a relative prioritization of the calendar entry. At least in some instances, the calendar data 22 may be extracted from text messages and/or emails that include information related to dates.

As another non-limiting example, in certain embodiments, the processor 36 may extract contact data 24 from operations performed on a project management application and/or contacts list (e.g., contact information). The contact data 24 and/or extracted contact data include data indicating roles (e.g., a supervisory role or a supportive role) of one or more users corresponding to a project. As such, the processor 36 may store the extracted calendar data 22 in the group information database 16 to determine a relative prioritization of the calendar entry. In addition, the processor 36 may store extracted contact data 24 in the group information database 16 to determine a relative prioritization of the project and communications corresponding to the project. It should be noted that email data 18 and/or text data 20 may include calendar data 22, such as a patterns of strings referencing a date. Additionally, it should be noted that email data 18 and/or text data 20 may include contact data 24, such as the email(s) that received and/or sent an email.

In addition, in certain embodiments, the method 52 may include receiving (e.g., via the group information management server(s) 14 of FIG. 1) data relating to one or more interactions with a subset of the group information management data from the plurality of members 12 (block 56). In general, the data relating to the one or more interactions with a subset of the group information management data includes data indicating a rate or frequency of accessing communications (e.g., emails or text messages), calendar entries, or documents that include the subset of group information management data. In some embodiments, the one or more interactions may include one or more other members of a group reading the subset of the group information management data. In some embodiments, the one or more interactions may include one or more other members of the group responding to the subset of the group information management data. In addition, in some embodiments, the one or more interactions may include one or more other members of the group updating the subset of the group information management data. In any case, the data relating to the one or more interactions relate to interactions of communications, calendar invites, and the like, that include the subset of the group information management data.

As one non-limiting example, in certain embodiments, the subset of the group information management data may include email data 18 indicating a first user sent a second user an email. As such, the data relating to the one or more interactions may generally indicate a rate or frequency of the second user accessing emails that reference the first user (e.g., by name, by title) or include an email corresponding to the first user (e.g., the email is sent by the first user, the first user is cc'd on the email, the first user responded to the email). That is, the data may include an average response time, an indication of a user flagging the email, an average time for opening the email after receiving the email, data indicating devices that the user accesses to open the email (e.g., a phone, a smartwatch, or a personal computer), a time the user accesses the email (e.g., during work hours or outside of work hours), and the like.

As another non-limiting example, in certain embodiments, the subset of the group information management data may include content and/or keywords indicating a particular project. As such, the data relating to the one or more interactions may generally indicate a rate or frequency that the user accesses files (e.g., text-based documents, video files, audio files, and/or image files), calendar entries, and/or communications that include the keywords or additional keywords that indicate the files and/or communications that correspond to the particular project. Although the discussion above references email data 18 and keywords, it should be noted that the discussion above may also apply to contact data text data 20, calendar data 22, and contact data 24.

In addition, in certain embodiments, the method 52 may include providing the subset of the group information management data to a specific member 12 of the group (block 58). In general, the processor 36 may provide the subset of the group information management data (i.e., files, calendar entries, and/or communications that include the subset of the group information management data) to a computing device 34, phone, tablet, or other suitable electronic computing device corresponding to the specific member 12 based on a determined prioritization of the subset of the group information management data for the specific user.

In addition, in certain embodiments, the method 52 may include prioritizing or deprioritizing the subset of the group information management data based at least in part on the one or more interactions (block 60). As described above, the processor 36 may provide the subset of the group information management data based on a determined prioritization. In general, the prioritization may be a representation of a relative priority, such as a numerical value or otherwise. For example, if the processor 36 determines that a first user typically ignores emails from a second user (e.g., does not access or the average response or access time of emails having particular email data is greater than an average response time), the processor 36 may provide an email having the subset of the group information management data (i.e., sent by the second user) in a manner that de-emphasizes the received email. For example, the processor 36 may archive the email or mark the email for deletion, providing a portion of the email, and/or automatically delete the email (e.g., if more than a threshold of users do not access the email or otherwise ignore the email), thereby freeing up memory that may be utilized for other data (e.g., emails, files, and the like). In general, the processor 36 may determine to de-emphasize a communication, calendar entry, or otherwise based on frequency of a user or additional users (e.g., a group of users) accessing the email or email having specific content, keywords, or indicating names, titles, and/or emails corresponding to certain users being below a threshold (e.g., 30%, 40%, 50%, 60%, 70%) or within a threshold range.

As described above, de-emphasizing the subset of the group information data may include downloading only a portion of the email. For example, if the processor 36 receives a communication that includes content (e.g., images) and the processor 36 determines to de-emphasize the email based on the content, then the processor 36 may not download the entire email. That is, the processor 36 may cause an application to download only a portion of the email (e.g., the subject line, the body of the email), thereby freeing up memory that may be used for other files and/or communications. Although the discussion above references email data 18, it should be noted that the discussion above may also apply to contact data text data 20, calendar data 22, and contact data 24.

In some embodiments, emphasizing or prioritizing the subset of the group information management data may include causing a display to provide a notification of the subset of the group information management data. For example, if the processor 36 receives an email and determines that the email includes content having a prioritization above a threshold prioritization, the processor 36 may cause the display to provide a notification indicating that an email has been received which include the content. As one non-limiting example, the content may include updated data for a project that a user is working on. As such, if the processor 36 determines the prioritization of the updated data is above the threshold (e.g., based on a due date of the project or a meeting for the project being within a threshold period of time), the processor 36 may push the updated data to the user. In this way, the processor 36 may reduce operations performed by the computing device 34 using data that may be old or outdated, thus freeing up computational resources of the computing device 34 for other operations.

Figure 3:
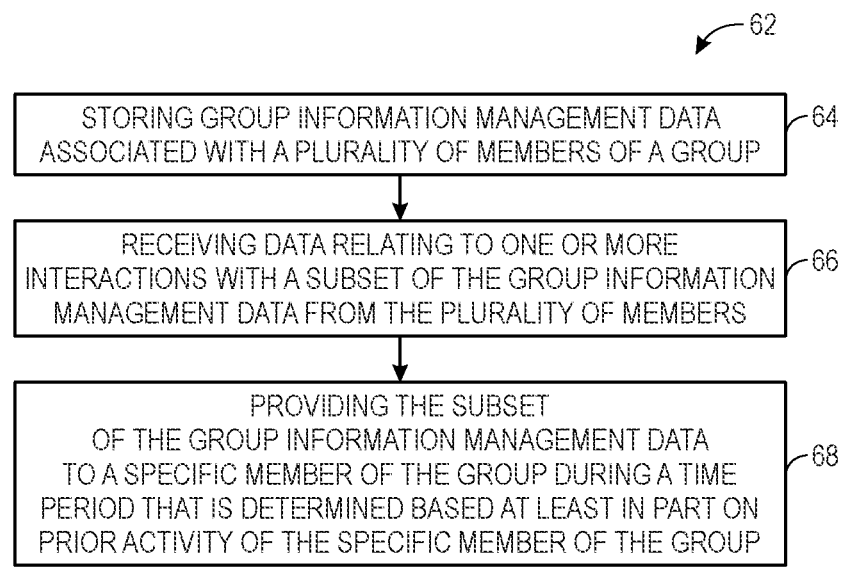
FIG. 3 is a flow diagram of another method of operating the group information management system of FIG. 1, in accordance with embodiments described herein.

FIG. 3 is a flow diagram of another method 62 of operating the group information management system 10 of FIG. 1. As illustrated, in certain embodiments, the method 62 may include storing (e.g., in the group information database(s) 16 of FIG. 1) group information management data (e.g., email data 18, text message data 20, calendar data 22, and contact data 24, among other types of group information management data) associated with a plurality of members 12 of a group (block 64). In general, the processor 36 may perform block 64 in a generally similar manner as described with respect to block 54 of the method 52.

In addition, in certain embodiments, the method 62 may include receiving (e.g., via the group information management server(s) 14 of FIG. 1) data relating to one or more interactions with a subset of the group information management data from the plurality of members 12 (block 66). In general, the processor 36 may perform block 66 in a generally similar manner as described with respect to block 56 of the method 52.

In addition, in certain embodiments, the method 62 may include providing (e.g., via the group information management server(s) 14 of FIG. 1) the subset of the group information management data to a specific member 12 of the group during a time period that is determined (e.g., via the group information management server(s) 14 of FIG. 1) based at least in part on prior activity of the specific member 12 of the group (block 68). In general, the processor 36 may perform block 66 in a generally similar manner as described with respect to blocks 58 and 60 of the method 52. Additionally, processor 36 may provide the subset of the group information to a specific member (e.g., user) during a time period that is determined by the processor 36 based on prior activity of the group member. In general, the prior activity of the group member may include usage habits. For example, the user may prefer to utilize email after meetings, only during work hours, or during a predetermined time during the day. As such, the time period may be a delay from the time period the email is received.

In some embodiments, the processor 36 may utilize calendar data 22 to determine the usage habits. For example, the processor 36 may receive calendar data 22 corresponding to a user indicating calendar entry including a time period corresponding to when the user is in a meeting. Additionally, the calendar data 22 may include an open calendar entry (e.g., a gap between calendar entries) indicating a time period corresponding to when the user does not have a meeting or other obligation scheduled on a calendar application. As such, if the processor 36 determines that a time period corresponding to email usage does not overlap with the time period corresponding to a meeting, the processor 36 may determine to delay an email communication for a time period that does not overlap with a time period corresponding to calendar entry.

In some embodiments, the usage habits may indicate that the user prefers to receive emails having certain emails data regardless of calendar data. That is, the usage habits may indicate that the certain email data 18, text data 20, calendar data 22, and/or contact data 24 may have a relatively higher priority, and thus may be emphasized. Accordingly, if the processor 36 receives an email having email data 18 indicating the relative higher priority, such as indicating that the email was sent by a supervisor of the user, the processor 36 may push the email to the user. For example, the processor 36 may cause the display to show a notification of the email and/or open an application to display the notification. Accordingly, the time period for emphasized or relatively higher priority data may be relatively shorter than the time period described above regarding providing data during gaps in calendar entries.

Figure 4:
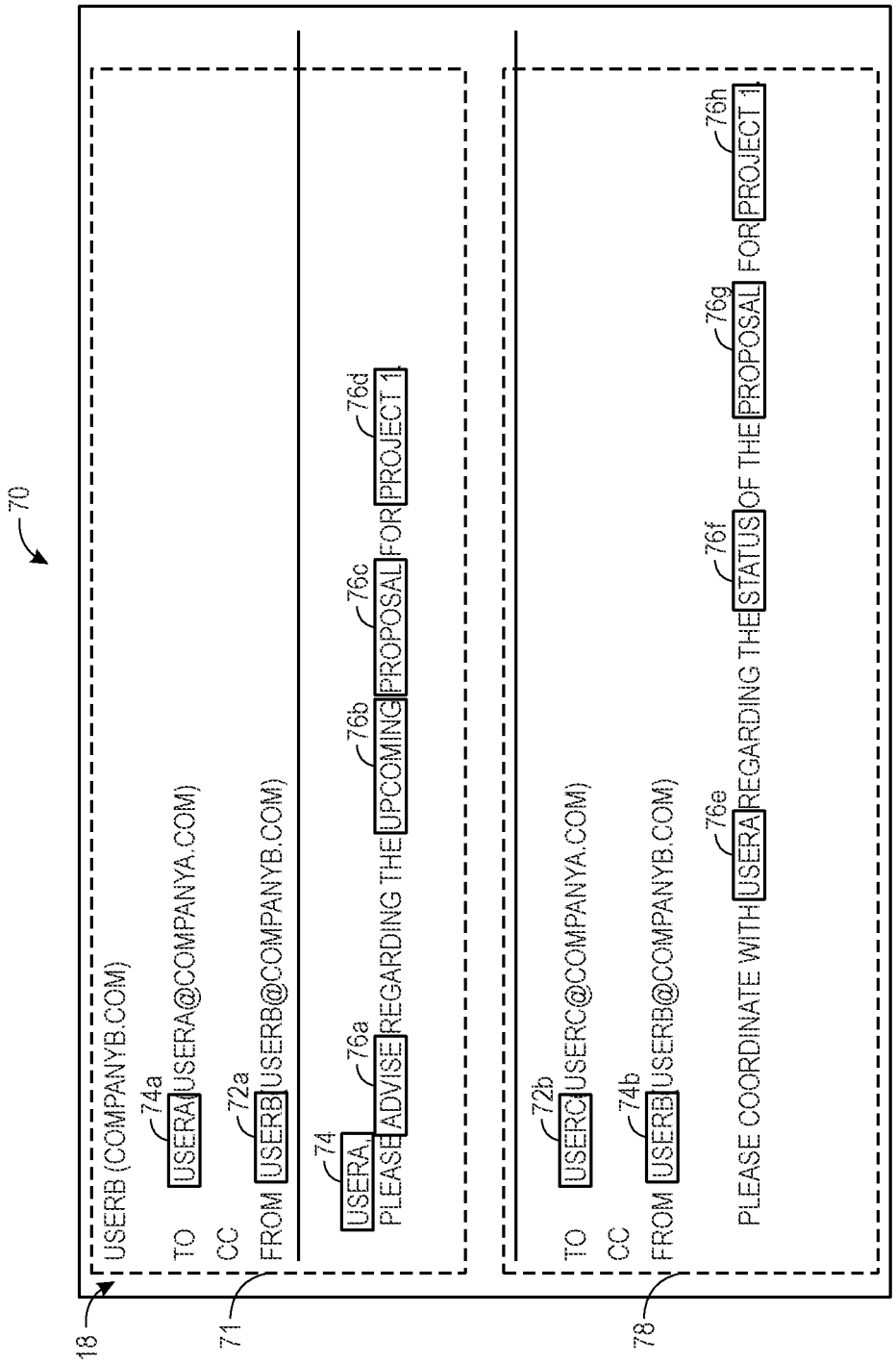
FIG. 4 is a screenshot of an email with email data that may be used for operating the group information system of FIG. 1, in accordance with embodiments described herein.

To further illustrate group information that may be utilized by the group information management server 14 of FIG. 1, FIG. 4 illustrates a window 70 displaying a first email 71 with content that may be analyzed by the processor 36 and stored as email data 18. As illustrated, the content of the first email 71 includes a first sender information 72a, a first recipient information 74a, and keywords 76a, 76b, 76c, 76d that may be identified by the processor 36 to determine whether the first email 72 should be emphasized or de-emphasized. Additionally, the window 70 displays a second email 78 corresponding to an earlier interaction (e.g., before the interaction corresponding to the first email 72) between users. As illustrated, the content of the second email 78 includes a second sender information 72b, a second recipient information 74b, and keywords 76e, 76f, 76g, 76h that may be identified by the processor 36 to determine whether the first email 72 should be emphasized or de-emphasized (e.g., determine a prioritization).

Accordingly, to illustrate how the method 52 and/or the method 62 may be utilized by the processor 36, the processor 36 may store one or more of the email data 18 (e.g., the first sender information 72a, the first recipient information 74a, and the keywords 76a, 76b, 76c, 76d) corresponding to the first email 71 as the group information management data. Additionally, the processor 36 may store one or more of the email data (e.g., the sender information 72b, a second recipient information 74b, and keywords 76e, 76f, 76g, 76h) corresponding to the second email 78. Further, the processor 36 may analyze data relating to one or more interactions with the email data 18 of the first email 71 and/or the second email 78. For example, based on the analysis of the email data 18, the processor 36 may determine that a first user (i.e., "UserA") corresponding to the first recipient information 74a) typically responds to emails from a second user (i.e., "UserB") in a duration below a threshold corresponding to an average response time of the first user. As such, the processor 36 may prioritize the first email 71, such as by causing the display of the computing device 34 to display a window including the first email.

Figure 5:
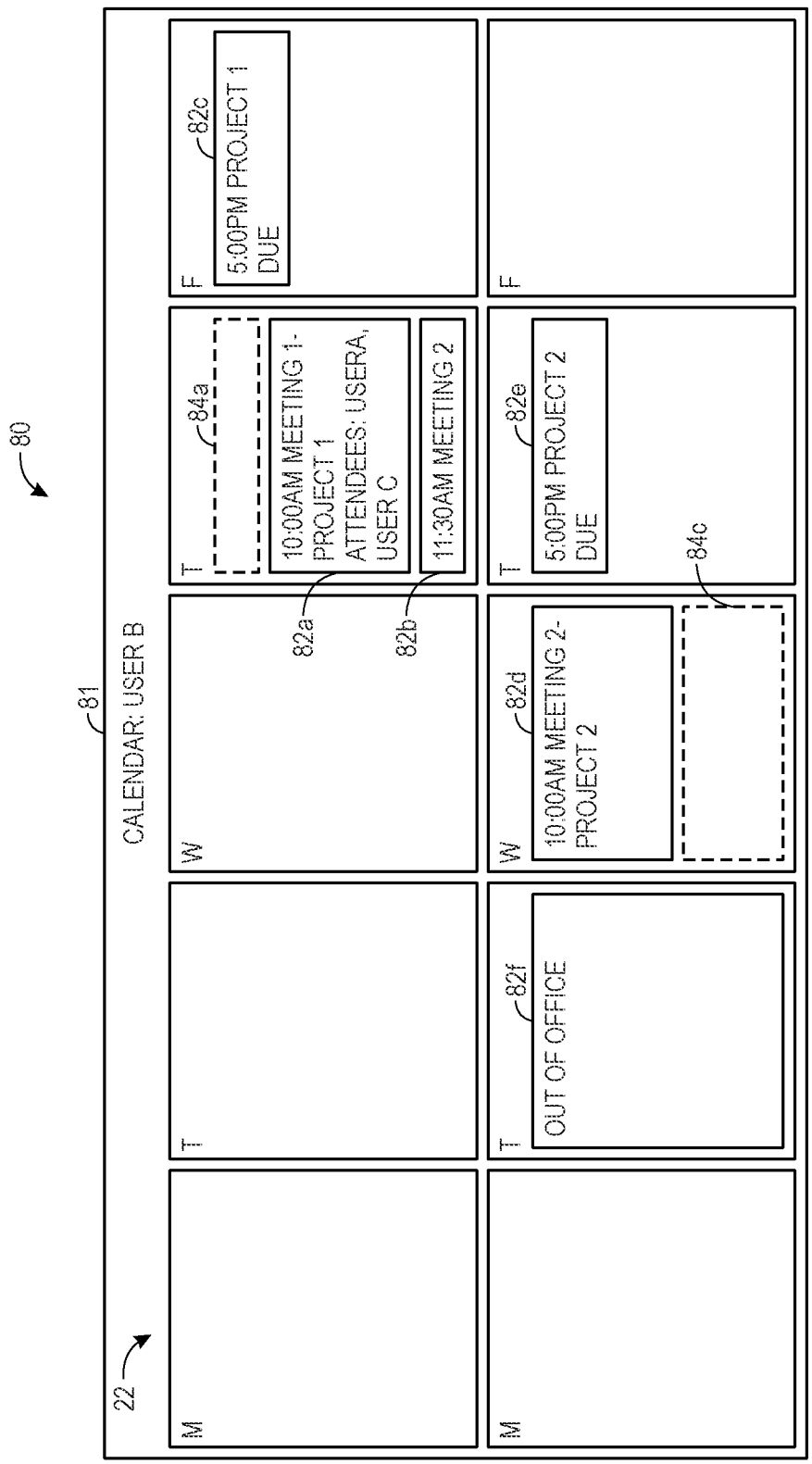
FIG. 5 is a screenshot of a calendar with calendar data that may be used for operating the group information system of FIG. 1, in accordance with embodiments described herein.

As described herein, calendar data 22 may be utilized by the group information management server 14 to determine a prioritization of certain group information data. To illustrate this, FIG. 5 illustrates a window 80 displaying a calendar 81 with content that may be analyzed by the processor 36 and stored as calendar data 22. As illustrated, the content of the calendar 81 generally includes calendar entries 82 and open calendar entries 84 (e.g., a gap in calendar entries) that may be identified by the processor 36 to determine whether interactions should be emphasized or de-emphasized. For example, the calendar 81 includes first calendar entry 82a during a first time period (e.g., beginning at 10:00 AM) and a second calendar entry 82b during a second time period (e.g., beginning at 11:30 AM) that is after the first time period. The calendar also includes a first open calendar entry 84a during a third time period before the first time period and the second time period. Additionally, the calendar 81 includes a third calendar entry 82c during a fourth time period occurring the day after the first time period, the second period, and the third time period.

Further, the calendar 81 includes a fourth calendar entry 82d during a first time period (e.g., beginning at 10:00 AM) and a fifth calendar entry 82e during a fifth time period that is after the first time period. The calendar also includes a second open calendar entry 84b during a third time period after the first time period and before the second time period. Additionally, the calendar 81 includes a sixth calendar entry 84f during a sixth time period occurring the day before the fourth time period, the fifth period, and the sixth time period.

As illustrated, the third time period of the third calendar entry 82c occurs before fifth calendar entry 82e. In particular, the third calendar entry 82c corresponds to a due date for a first project (i.e., "Project 1"), and the fifth calendar entry 82e corresponds to a due date for a second project (i.e., "Project 2". At least in some instances, the processor 36 may prioritize group information management data corresponding to the first project over the second project due to the first project's due date being before the second project's due date. Accordingly, the processor 36 may delay a communication corresponding to the second project received during the first open calendar entry 84a until the day before the sixth open calendar entry 84f. Further, the processor 36 may delay information unrelated to either the first project or the second project to be displayed on an application executed by the computing device 34 during one of the open calendar entry 84. In this way, the processor 36 may reduce the amount of data received by computing devices 34, which may otherwise utilize computational resources in an inefficient manner.

While only certain features of the disclosure have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A group information management system, comprising:
one or more group information management database servers configured to store group information management data associated with a plurality of members of a group, wherein the group information management data comprises data relating to calendar entries; and
one or more group information management servers configured to:
determine group information management data to be communicated to a first application being executed on a first computing device associated with a first member of the group;
determining a first project corresponding the group information management data;
determining additional group management data corresponding to a second project associated with the first member of the group;
assign a priority to the group information management data based on the first project being different than the second project, wherein a subset of the group information management data associated with the first member of the group is prioritized by the one or more group information management servers based at least in part on one or more interactions with the subset of the group information management data associated with the first member of the group via other applications being executed on other computing devices associated with other members of the plurality of members of the group;
determining the priority is below a threshold;
identifying a gap in the calendar entries to transmit the group information management data based on the priority being below the threshold; and
providing the group information management data to the first application in accordance with the gap in the calendar entries.

2. The group information management system of claim 1, wherein the group information management data comprises data relating to electronic mail messages, text messages, and contact information associated with the plurality of members of the group.

3. The group information management system of claim 1, wherein the prioritized subset of the group information management data comprises one or more electronic mail messages with which one or more other members of the group have interacted via one or more other applications being executed on one or more other computing devices associated with the one or more other members of the group.

4. The group information management system of claim 1, wherein the prioritized subset of the group information management data comprises one or more text messages with which one or more other members of the group have interacted via one or more other applications being executed on one or more other computing devices associated with the one or more other members of the group.

5. The group information management system of claim 1, wherein the prioritized subset of the group information management data comprises one or more additional calendar entries with which one or more other members of the group have interacted via one or more other applications being executed on one or more other computing devices associated with the one or more other members of the group.

6. The group information management system of claim 1, wherein the prioritized subset of the group information management data comprises one or more contacts with which one or more other members of the group have interacted via one or more other applications being executed on one or more other computing devices associated with the one or more other members of the group.

7. The group information management system of claim 1, wherein the one or more interactions with the prioritized subset of the group information management data comprises one or more other members of the group updating the prioritized subset of the group information management data.

8. The group information management system of claim 1, wherein prioritization of the subset of the group information management data is based at least in part on content of the subset of the group information management data.

9. A method, comprising:
  storing, in one or more group information management database servers, group information management data associated with a plurality of members of a group, wherein the group information management data comprises data relating to calendar entries;
  receiving, via the one or more group information management servers, data relating to one or more interactions with the group information management data from the plurality of members of the group;
  determining, via the one or more group information management servers, a first project due date associated with the one or more group information management data;
  determining, via the one or more group information management servers, a second project due date that occurs before the first project due date;
  determining, via the one or more group information management servers, a priority rating corresponding to the group information management data based at least in part on the second project due date occurring before the first project due date;
  determining, via the one or more group information management servers, that the priority rating is below a threshold;
  identifying, via the one or more group information management servers, a gap in the calendar entries based on the priority rating being below the threshold; and
  providing, via the one or more group information management servers, a portion of the group information management data to a specific member of the plurality of members of the group during the gap in the calendar entries.

10. The method of claim 9, wherein the group information management data comprises data relating to electronic mail messages, text messages, calendar entries, and contact information associated with the plurality of members of the group.

11. The method of claim 9, wherein the portion of the group information management data comprises one or more keywords from one or more electronic mail messages from a second member of the group to a first member of the group.

12. The method of claim 9, comprising providing, via the one or more group information management servers, the portion of the group information management data to the specific member of the plurality of members of the group based on the first project due date.

13. The group information management system of claim 1, wherein the one or more group information management servers are configured to assign the priority to the group information management data based on a first due date of the first project being different than a second due date of the second project.

* * * * *